US007616329B2

(12) United States Patent  
Villar et al.

(10) Patent No.: US 7,616,329 B2
(45) Date of Patent: Nov. 10, 2009

(54) SYSTEM AND METHOD FOR INSPECTING RAILROAD TRACK

(75) Inventors: Christopher M. Villar, Georgetown, TX (US); Steven C. Orrell, Georgetown, TX (US); John Anthony Nagle, II, Cedar Park, TX (US)

(73) Assignee: Georgetown Rail Equipment Company, Georgetown, TX (US)

( * ) Notice: Subject to any disclaimer, the term of this patent is extended or adjusted under 35 U.S.C. 154(b) by 25 days.

(21) Appl. No.: 11/172,618

(22) Filed: Jun. 30, 2005

(65) Prior Publication Data

US 2006/0017911 A1    Jan. 26, 2006

Related U.S. Application Data

(60) Provisional application No. 60/584,769, filed on Jun. 30, 2004.

(51) Int. Cl.
*G01B 11/14* (2006.01)
(52) U.S. Cl. ..................................... 356/625
(58) Field of Classification Search ................ 356/602, 356/606, 607; 33/287; 104/2, 7.2
See application file for complete search history.

(56) References Cited

U.S. PATENT DOCUMENTS

| | | | |
|---|---|---|---|
| 3,562,419 A | | 2/1971 | Stewart et al. |
| 4,490,038 A | | 12/1984 | Theurer et al. |
| 4,531,837 A | | 7/1985 | Panetti |
| 4,554,624 A | | 11/1985 | Wickham et al. |
| 4,653,316 A | * | 3/1987 | Fukuhara ................ 356/608 |
| 4,700,223 A | * | 10/1987 | Shoutaro et al. ......... 356/606 |
| 4,915,504 A | * | 4/1990 | Thurston ................ 356/604 |
| 5,487,341 A | | 1/1996 | Newman et al. |
| 5,791,063 A | | 8/1998 | Kesler et al. |
| 6,064,428 A | | 5/2000 | Trosino et al. |
| 6,347,265 B1 | | 2/2002 | Bidaud |

(Continued)

FOREIGN PATENT DOCUMENTS

FR    2 674 809    9/1992

OTHER PUBLICATIONS

PCT International Search Report and Written Opinion for PCT/US05/23132, dated Apr. 17, 2007.

*Primary Examiner*—Gregory J Toatley, Jr.
*Assistant Examiner*—Juan D Valentin
(74) *Attorney, Agent, or Firm*—Howrey LLP

(57) ABSTRACT

A system and method for inspecting railroad track is disclosed. The disclosed system includes lasers, cameras, and a processor. The lasers are positioned adjacent the track. The laser emits a beam of light across the railroad track, and the camera captures images of the railroad track having the beam of light emitted thereon. The processor formats the images so that they can be analyzed to determine various measurable aspects of the railroad track. The disclosed system can include a GPS receiver or a distance device for determining location data. The measurable aspects that can be determined by the disclosed system include but are not limited to the spacing between crossties, the angle of ties with respect to rail, cracks and defects in surface of ties, missing fastener components, misaligned fastener components, sunken tie plates, raised spikes, rail wear, gage of rail, ballast height relative to ties, size of ballast stones, and break or separation in the rail. The system includes one or more algorithms for determining these measurable aspects of the railroad track.

80 Claims, 8 Drawing Sheets

U.S. PATENT DOCUMENTS

| | | |
|---|---|---|
| 6,356,299 B1 | 3/2002 | Trosino et al. |
| 6,526,352 B1 | 2/2003 | Breed et al. |
| 6,556,945 B1 | 4/2003 | Burggraf et al. |
| 6,615,648 B1 * | 9/2003 | Ferguson et al. ............. 73/146 |
| 6,634,112 B2 | 10/2003 | Carr et al. |
| 6,647,891 B2 * | 11/2003 | Holmes et al. ............. 356/602 |
| 6,681,160 B2 | 1/2004 | Bidaud |
| 2003/0097235 A1 | 5/2003 | Theurer et al. |
| 2004/0122569 A1 | 6/2004 | Bidaud |
| 2004/0263624 A1 | 12/2004 | Nejikovsky et al. |
| 2005/0111009 A1 | 5/2005 | Keightley et al. |

* cited by examiner

SYSTEM AND METHOD FOR INSPECTING RAILROAD TRACK

CROSS REFERENCE TO RELATED APPLICATION

This application is a non-provisional application claiming priority to U.S. Provisional Application Ser. No. 60/584,769, entitled, "System and Method for Inspecting Railroad Track," by John Nagle and Steven C. Orrell, filed Jun. 30, 2004, hereby incorporated by reference in its entirety herein.

FIELD OF THE INVENTION

The present invention relates generally to a system and method for inspecting railroad track and, more particularly to a system and method for inspecting aspects of a railroad track using a laser, camera, and a processor.

BACKGROUND OF THE INVENTION

Railroads are generally constructed on a base layer of compacted, crushed stone material. A layer of gravel ballast rests on top of this stone layer. Crossties are laid in and on this ballast layer, and two parallel steel rails are attached to the crossties with fasteners. The majority of crossties in service are made of wood. Various other materials are used such as concrete, steel, and composite or recycled material in the manufacture of crossties. These alternative material crossties make up a relatively small percentage of all crossties. The crossties maintain the gage or lateral spacing of the rails. The crossties distribute the axle loads from the trains to the ballast layer below the crossties and contribute to the cushioning effect of the entire track structure. Over time, environmental factors can cause the crossties to deteriorate until they must be replaced. Annually, railroads in North America replace up to 2% or more of all wooden crossties. This constitutes several million crossties.

To manage the logistics of crosstie replacement and to quantify the need for new crossties, railroad inspectors attempt to grade the condition of crossties and the fastener system on a regular basis. This grading is most often done with a visual inspection to identify crossties and fasteners that are rotten, broken, split, or worn to an extent that their serviceable life is at its end. The process of visual inspection is quite time consuming. In practice, inspection of the track is performed by an inspector walking along the track to inspect and record the conditions of the crosstie and/or fasteners, which are spaced approximately every 20-inches along the track. One particular North American railroad reports that a crew of 3 or 4 men can grade only about 5 to 7 miles of track per day.

Devices for inspecting rail are known in the art, and software for analyzing and organizing data obtained with such devices is known in the art. For example, TieInspect® by ZETA-TECH Associates, Inc. of New Jersey is a computerized crosstie inspection system having a hand held device and software. The hand held device is used by inspectors when walking along the track and surveying the track, and the software is used to analyze and organize the data obtained with the device.

In addition to the grading of crossties, other track components must be periodically inspected for wear and deterioration. These include wear on the riding surface of the rail, integrity of anchors and fasteners, alignment of the tie plates, condition of the ballast, and gage of the rail. As with the grading of crossties, inspecting these aspects of rail can also be time consuming. Systems are known in the art for inspecting rails. For example, OmniSurveyor3D® by Omnicom Engineering of the United Kingdom is a system for surveying the infrastructure on railways. Also, ENSCO, Inc. of Minnesota provides a Laser Gage Measurement System for measuring the gage of rail using lasers.

The present invention is directed to overcoming, or at least reducing the effects of, one or more of the problems set forth above.

SUMMARY OF THE DISCLOSURE

A system and method for inspecting railroad track is disclosed. The disclosed system includes lasers, cameras, and a processor. The lasers are positioned adjacent to the track. The laser emits a beam of light across the railroad track, and the camera captures images of the railroad track having the beam of light emitted thereon. The processor formats the images so that they can be analyzed to determine various measurable aspects of the railroad track. The disclosed system can include a GPS receiver or a distance device for determining location data. The measurable aspects that can be determined by the disclosed system include but are not limited to: the spacing between crossties, the angle of ties with respect to rail, cracks and defects in surface of ties, missing tie plates, misaligned tie plates, sunken tie plates, missing fasteners, damaged fasteners, misaligned fasteners, worn or damaged insulators, rail wear, gage of rail, ballast height relative to ties, size of ballast stones, and a break or separation in the rail. The system includes one or more algorithms for determining these measurable aspects of the railroad track.

The foregoing summary is not intended to summarize each potential embodiment or every aspect of the subject matter of the present disclosure.

BRIEF DESCRIPTION OF THE DRAWINGS

The foregoing summary, preferred embodiments, and other aspects of the subject matter of the present disclosure will be best understood with reference to a detailed description of specific embodiments, which follows, when read in conjunction with the accompanying drawings, in which.

Figure 1:
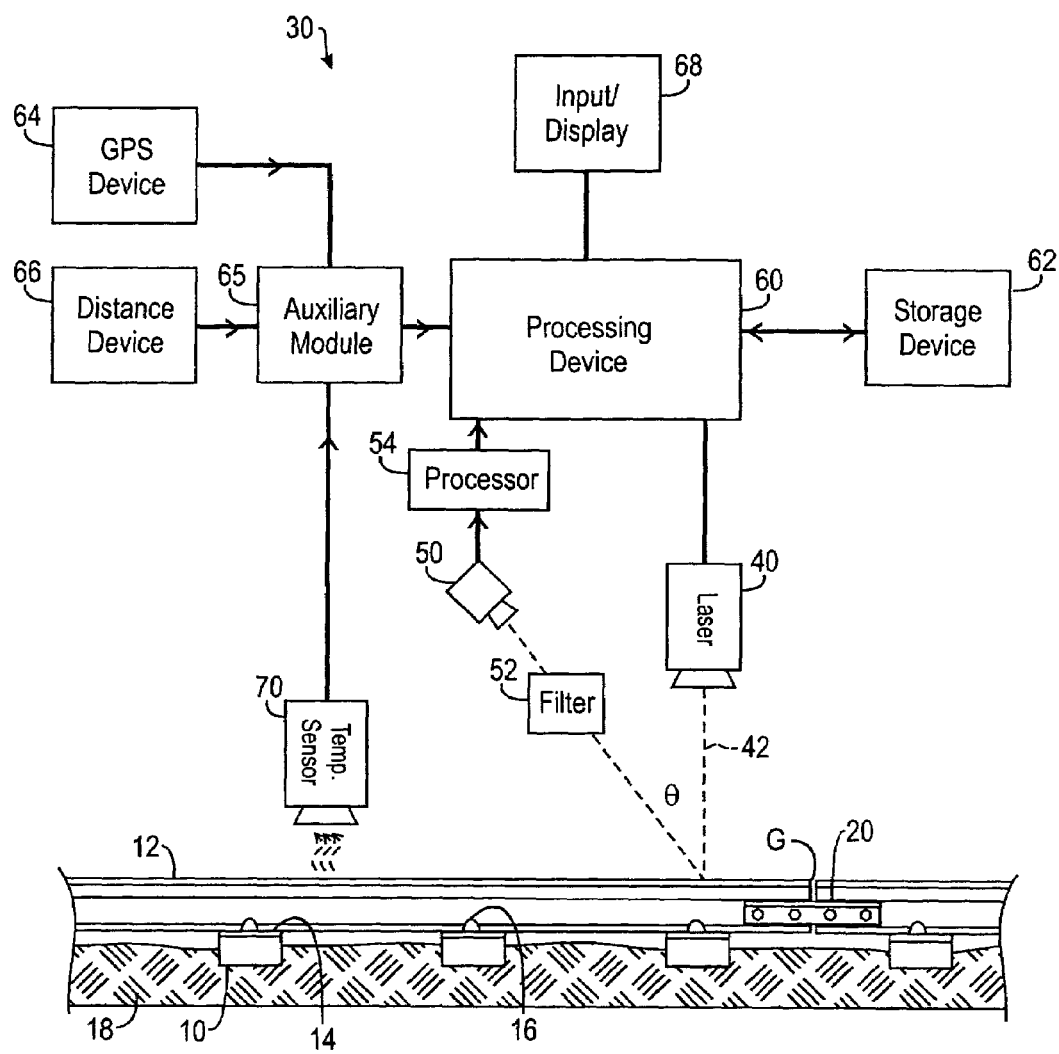
FIG. 1 schematically illustrates an embodiment of the disclosed inspection system.

While the disclosed inspection system and associated methods are susceptible to various modifications and alternative forms, specific embodiments thereof have been shown by way of example in the drawings and are herein described in detail. The figures and written description are not intended to limit the scope of the disclosed inventive concepts in any manner. Rather, the figures and written description are provided to illustrate the disclosed inventive concepts to a person skilled in the art by reference to particular embodiments, as required by 35 U.S.C. § 112.

DETAILED DESCRIPTION

Figure 2:
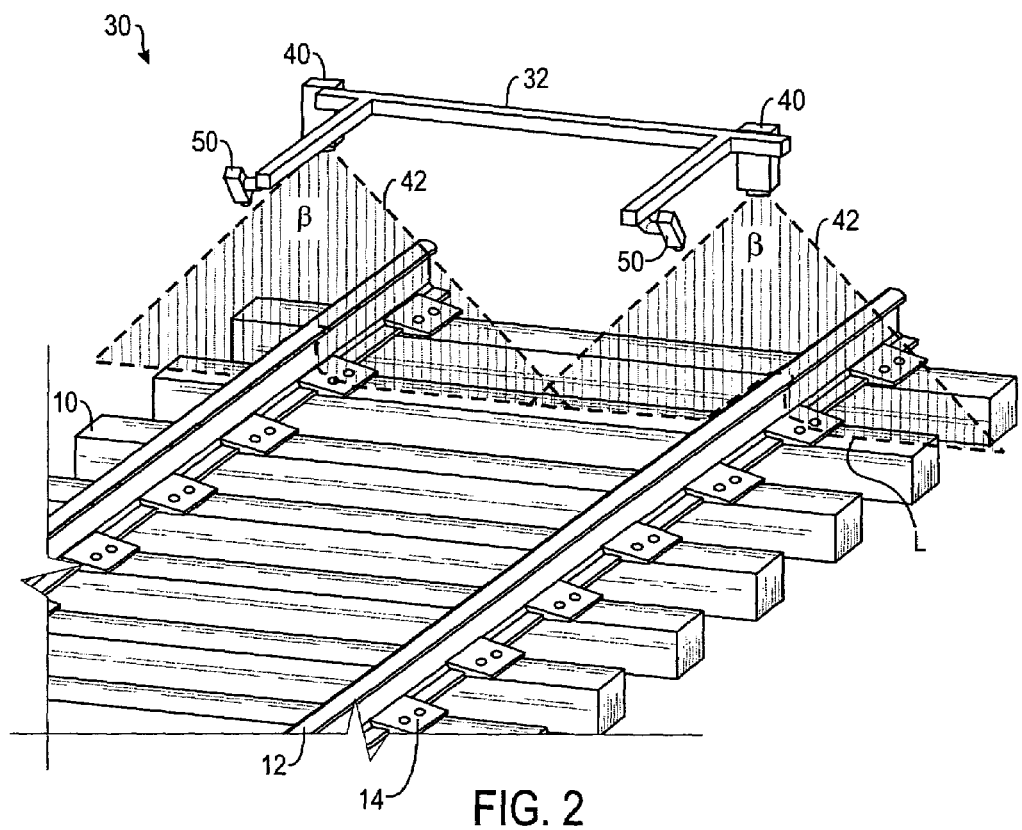
FIG. 2 illustrates a portion of an embodiment of a system for inspecting railroad track according to certain teachings of the present disclosure.

Referring to FIGS. 1 and 2, an embodiment of a system 30 for inspecting railroad track according to certain teachings of the present disclosure is illustrated. In FIG. 1, the disclosed inspection system 30 is schematically illustrated relative to a railroad track. In FIG. 2, a portion of the disclosed inspection system 30 is illustrated in a perspective view relative to railroad track.

As best shown in FIG. 1, the disclosed inspection system 30 includes a light generator such as a laser 40, a device for receiving light reflected from the area to be inspected such as a camera 50, and a processing device 60. In the implementation shown in FIG. 1, the disclosed inspection system 30 is used to survey the track bed of a railroad track. Although the disclosed inspection system and associated methods are described for use in inspecting railroad track, it will be appreciated with the benefit of the present disclosure that the disclosed system and method can be used in other areas and in industries where surfaces or components require inspection. For example, the disclosed inspection system and method can be used to inspect roads, electrical lines, piping, or other networks or systems.

The track bed includes crossties 10, rails 12, tie plates 14, spikes 16, and ballast 19. Briefly, the laser 40 projects a beam 42 of laser light at the track bed. The beam 42 produces a projected line L, shown in FIG. 2, on the track bed that follows the contours of the surfaces and components of the track bed. The light receiver, camera 50, captures an image of the line L of laser light 42 projected on the track bed. The camera 50 sends the captured image to the processing device 60 for processing and analysis as described in more detail below.

As best shown in FIG. 2, pairs of lasers 40 and cameras 50 are positioned above each one of the rails 12 of the track. The lasers 40 and the cameras 50 can be assembled onto a rigid framework 32, which can be mounted on an inspection vehicle (not shown) or other device moving along the track so as to maintain the inspection system 30 in the proper position. Only a portion of the framework 32 is shown in FIG. 2 for simplicity. However, it is understood that other known components for the framework 32 may be needed to mount the lasers 40 and the cameras 50 on an inspection vehicle.

In general, the inspection vehicle can be any suitable vehicle for traveling along the railroad track. For example, a common practice in the art is to equip a normal highway vehicle, such as a pick-up truck, with "hi-rail" gear mounted to the frame of the vehicle. Hi-rail gear typically includes a set of undersized railroad stock wheels that allow the highway vehicle to ride along the rails. In one embodiment, then, the framework 32 of the disclosed inspection system 30 can be mounted in the bed of a pick-up truck having "hi-rail" gear. Alternatively, the inspection vehicle can be maintenance of way (MoW) equipment that is specifically designed for working along the railroad track. In addition, the disclosed inspection system 30 can be mounted on a chassis that is towed by a vehicle or can be mounted on a locomotive or freight car.

As best shown in FIG. 2, the lasers 40 project a beam 42 of light having a predetermined angular spread $\beta$. The angular spreads $\beta$ of the two lasers 40 cover substantially the entire surface of the track bed. In this way, the lasers 40 produce a projected line L that is substantially straight and extends substantially across the track bed. Each laser 40 preferably produces a beam 42 having an angular spread $\beta$ of about 60-degrees and covers approximately one half of the track bed. Preferably, the lasers 40 project the beam 42 substantially perpendicular to the surface of the track. Alternatively, a single laser could be used that is positioned such as to create the projected line L across the track bed.

In addition, the lasers 40 are preferably infrared lasers having 4-watts of optical output and producing light at an infrared wavelength of about 810-nm. The relatively high optical output of the lasers 40 helps reduce effects of ambient light so that shielding is not necessary. A suitable laser for the disclosed inspection system 30 includes a Magnum laser manufactured by Stocker Yale. The parameters described above for the lasers 40 are preferred for inspecting the surface of a railroad track. Other implementations of the disclosed inspection system 30 can use an alternate number of light sources as well as different wavelengths, optical outputs, and angular spreads.

As best shown in FIG. 2, the cameras 50 are positioned adjacent the lasers 40. As best shown in FIG. 1, the cameras 50 are mounted at an angle $\theta$ with respect to the beam 42 of light projected from the lasers 40. In one embodiment, the cameras are positioned at an angle $\theta$ of about 60-degrees. As the disclosed inspection system 30 is moved along the track, the cameras 50 capture an image or frame of the track bed at small, regular increments. Preferably, the cameras 50 are capable of a substantially high frame rate, such as about 5405 frames per second.

Each still image or frame captured by the cameras 50 is then filtered and processed to isolate the contoured laser line L projected on the track bed. The cameras 50 are fitted with band-pass filters 52 that allow only the radiant energy substantially at the preferred infrared wavelength of the lasers 40 to pass. Because the wavelength of the lasers 40 is about 810-nm, the band-pass filters 52 of the cameras 50 can eliminate substantially all ambient light so that the camera 50 acquires a substantially clear, still image of the projected line L of light from the lasers 40.

Each of the two cameras 50 send image data directly to the processing device or computer 60 via transmission lines. Preferably, the camera 50 includes a processor 54 capable of converting or formatting the captured image of the projected line L into a dimensional profile that is sent directly to the processing device or computer 60. The ability of the camera 50 to process or format the captured image in this way can eliminate the need for expensive post processors or high-speed frame grabbers. A suitable camera for the disclosed inspection system 30 having such processing abilities includes a Ranger M50 manufactured by IVP Integrated Vision Products, Inc.

Among other common components, the processing device or computer 60 includes a microprocessor, inputs, outputs, and a data storage device 62. The data storage device 62 can include a hard drive, a non-volatile storage medium, a flash memory, tape, or CD-ROM. The processing device 60 can further include an input/display 68 for a track inspector to input and review data and to operate the disclosed inspection system 30. The processing device 60 operates with suitable software programs for storing and analyzing the various data obtained with the disclosed inspection system 30. For example, the processing device 60 can have any suitable image processing software, such as Matrox MIL, Common VisionBlox, Labview, eVision, Halcon, and IVP Ranger. For example, the processing device 60 can have image processing tools known in the art for analyzing image data from the cameras 50 such as Region of Interest (ROI) tools, filtering tools, blob tools, edge finders, histogram tools, and others.

To effectively process all of the data obtained with the disclosed inspection system 30, the processing device 60 in a preferred embodiment includes a computer having a fast processor, such as an Intel Pentium 4 processor capable of running at 2.8 GHz. To effectively store all of the data obtained with the disclosed inspection system 30, the storage device 62 preferably includes two large-capacity hard drives configured to use both read/write mechanisms simultaneously as one drive, which is also known as a Redundant Array of Independent Disks (RAID) system. The fast processor of the processing device 60 and the dual hard drives of the storage device 62 allow for sustained real-time storage of the data obtained with the disclosed inspection system 30. In a preferred embodiment, the power for the disclosed inspection system 30 can be provided by 110 V AC power from a belt driven generator running directly off the engine of the inspection vehicle.

Figure 3:
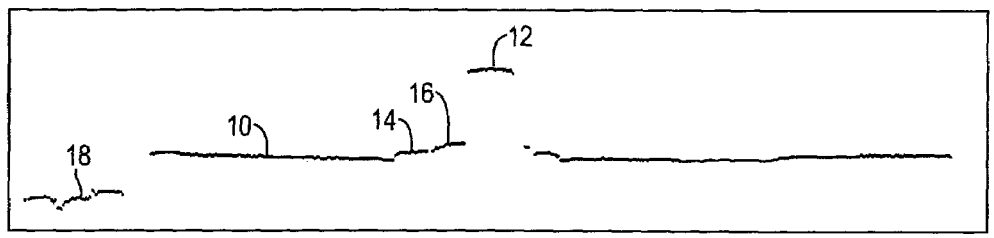
FIG. 3 illustrates an example frame of a portion of railroad track obtained with the disclosed inspection system.

With the beams 42 projected onto the irregular surface of the track and viewed at an angle, the projected line L shown in FIG. 2 follows the contours of the surface and components of the track bed. An example image or frame showing the projected line L of the track bed is shown in FIG. 3. The image data or frame includes a plurality of pixels given X-Y coordinates and shows a contour of the track bed captured by the cameras 50. Due to filtering and other image processing techniques known in the art, the image includes two pixel values, where the dark pixels represent the contour of the track bed. Every pixel of a given image data is given the same Z-coordinate, which represents the particular position along the length of the track at which the image data was captured. In this manner, a plurality of captured images produce a three-dimensional scan of the track bed in which each image of the scan has X-Y coordinates showing the contour of the track bed and has a Z-coordinate representing the particular position of the contour along the length of rail.

It is understood that the speed at which an image is captured is limited by the width and height of the scanned area, the distance between the discrete still images, the resolution of the still images, the maximum frame rate of the cameras 50, the processing speed of the computer 60, and the write speed of the data storage device 62. For a railroad application of the disclosed inspection system 30, one preferred example is spacing between still images or frames captured by the cameras 50 of about 0.1-inch, a preferred velocity of the inspection vehicle of about 30-mph, a preferred height of the scanned area of approximately 10 inches, and a preferred width of the scanned area of about 10-feet across the width of the track bed. To satisfy these preferred parameters, a camera system capable of about 5405 frames per second and a computer system capable of processing and recording at about 8.3 MPS is preferred. Each frame or image, such as shown in FIG. 3, may require about 1,536 bytes of storage. With a frame captured at about every 0.1-inches along the length of track, about 633,600 frames would be captured for one mile of track and would require 0.973 gigabytes of storage space.

Another embodiment and as shown in FIG. 1, the disclosed inspection system 30 may further include a temperature sensor 70 and a Global Position System (GPS) receiver 64 for obtaining geographical locations of the inspection vehicle when inspecting the railroad track. The GPS receiver 64 can include any suitable GPS receiver known in the art for obtaining geographical locations. For example, the GPS receiver 64 can be an independent, commercially available unit mounted on the inspection vehicle and connected to the processing device 60 with a suitable cable connection and input/output interface. The GPS receiver 64 can obtain the geographical location using a differential or non-differential GPS system. Techniques for obtaining substantially accurate location and time data with a GPS receiver 64 are well known in the art and are not discussed further. The geographical locations are sent to the processing device 60 and can be compiled with the image data of the track bed.

When the image data from the cameras 50 is recorded, the geographical location of the frame can also be recorded. Eliminating a continuous stream of geographical location data from the GPS receiver 64 to the computer 60 can free the processor time available for capturing the image data with the processing device 60. Therefore, the GPS receiver 64 preferably feeds data to an auxiliary module 65. The auxiliary module 65 packages this data and sends the data to the processing device or computer 60 when queried. In addition to obtaining geographical location data, the GPS receiver 64 can obtain time data. Furthermore, the location and time data obtained with the GPS receiver 64 can be used to determine other variables, such as the speed of the inspection vehicle, which can be used for various purposes disclosed herein. Thus, the disclosed inspection system 30 can use data from the GPS receiver 64 to trigger the cameras 50 to capture a still image of the track bed at about every 0.1-inches along the rail.

In an alternative embodiment and as shown in FIG. 1, the disclosed inspection system 30 can include a distance device 66 for obtaining geographical locations of the inspection vehicle when inspecting the rail. The distance device 66 can be an encoder that counts wheel revolutions or partial revolutions as the inspection vehicle moves along the rail or can be the existing odometer sensor on the inspection vehicle. The distance device 66 can provide location data to the processing device 60. Using the distance device 66, the disclosed inspection system 30 can trigger the cameras 50 to capture a still image of the track bed at about every 0.1-inches along the rail.

In another embodiment, the disclosed inspection system 30 can capture still images of the track bed at or near the maximum frame rate of the cameras 50 without being triggered by the GPS receiver 64 or distance device 66. For example, the cameras 50 and processing device 60 can operate at or near the maximum frame rate while the inspection vehicle travels along the track. Using the known average width of a crosstie 10 or tie plate 14, the disclosed inspection system 30 can calculate the velocity of the inspection vehicle. The disclosed system can then delete any extra frames to reduce data storage so that the retained frames would have an approximate spacing of 0.1-inch. It is understood that exact spacing of 0.1-inch may not always be possible, but the spacing will be known and may be between 0.05" and 0.1". In this embodiment, the same number of frames must be discarded between each retained frame on a given tie so that frame spacing remains uniform. For example, if the tie plates are known to be 8-inches wide and 244 frames are captured for a specific tie plate, then two frames can be discarded between each retained frame. If the entire set of frames were numbered 1 through 244, then the retained frames would be those numbered: 1, 4, 7, 10, ... 241, 244. The retained 82 frames would have a calculated spacing of 0.098-inch.

Alternatively, the disclosed system could interpolate between any two captured frames to create a new third frame at any desired location along the track. Some frames could then be discarded to achieve the exact frame spacing desired.

After the disclosed inspection system 30 completes a survey of railroad track, computer analysis of the image data is performed. The computer analysis can be performed by the processing device or computer 60 located in the inspection vehicle. Alternatively, the computer analysis can be performed by another computer system having image processing software known in the art. The computer analysis searches the image data and determines or detects locations along the track where defects occur or where allowable tolerances of the railroad track are not maintained. For a particular implementation, the computer analysis can be customized or changed. The geographic locations of defects or unallowable tolerances can be provided so that appropriate repairs can be made or maintenance work can be scheduled.

A number of measurable aspects of the railroad track can be determined or detected from the image data of the track bed obtained with the disclosed inspection system and associated methods. In examples that follow, a number of such measurable aspects are discussed, and various techniques for analyzing the measurable aspects are disclosed. It will be appreciated that these and other measurable aspects of the railroad track can be determined or detected from the image data of the track bed obtained with the disclosed inspection system. In addition, it will be appreciated that other techniques known in the art for analyzing the image data can be used with the disclosed inspection system and associated methods. Accordingly, the disclosed inspection system and associated methods are not intended to be limited to the measurable aspects and particular techniques described herein.

Figure 11:
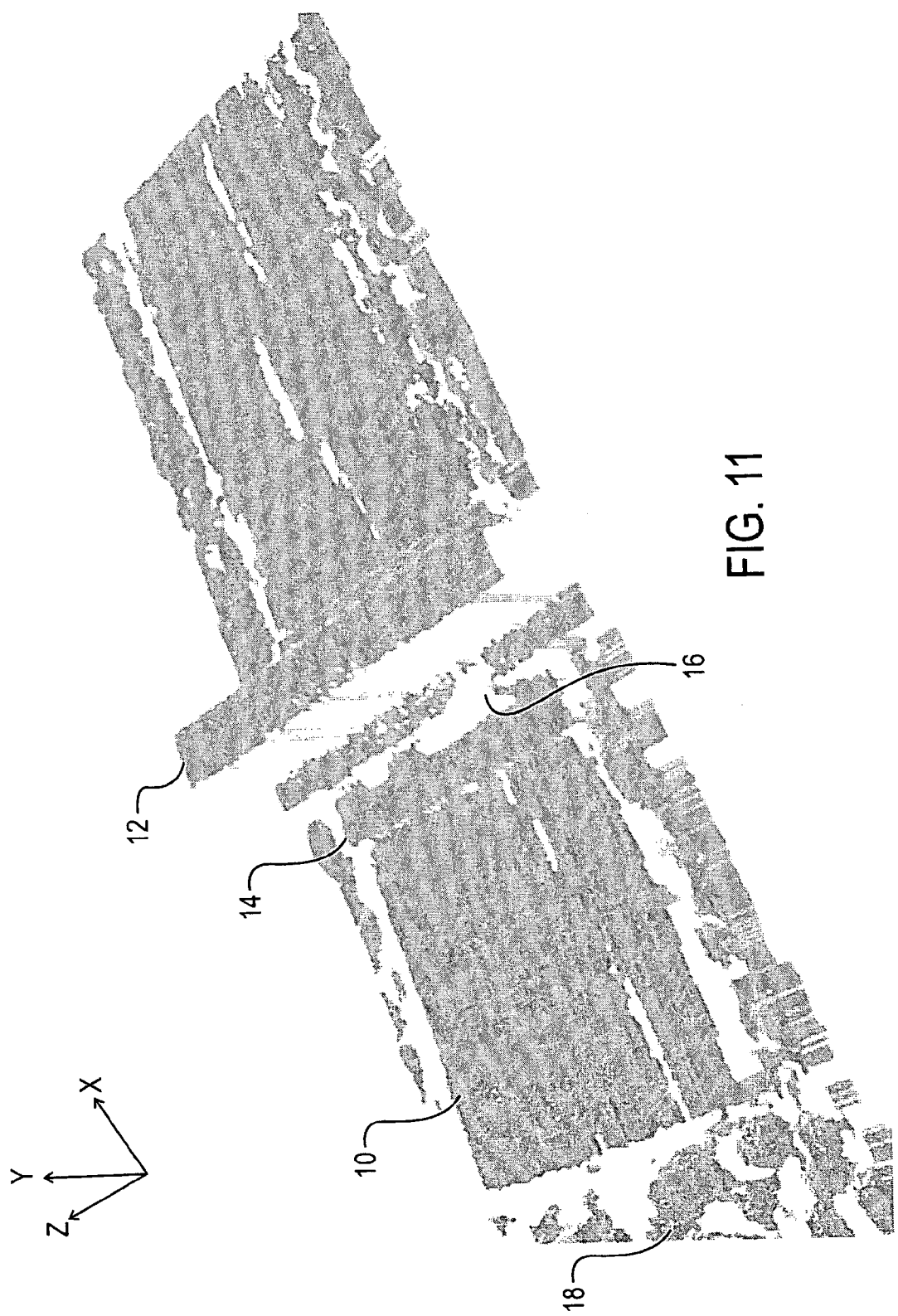
FIGS. 11 and 12 illustrate three-dimensional compilations of image data obtained with the disclosed inspection system.
Figure 12:
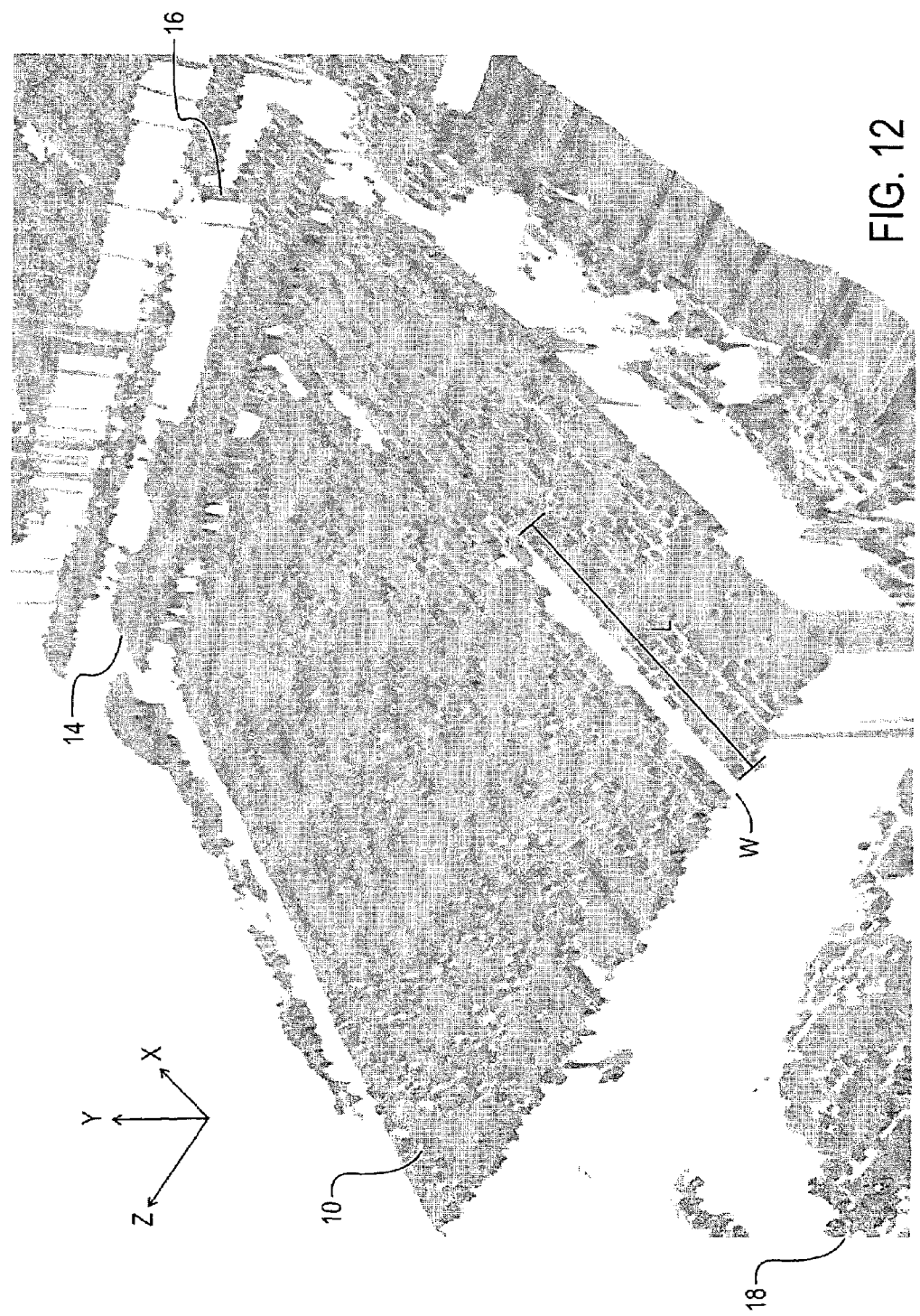

For clarity, FIGS. 11 and 12 illustrate example compilations of image data obtained with the disclosed inspection system and associated methods. FIG. 11 has a plurality of compiled image data showing a portion of a crosstie, tie plate, and rail in a perspective view. FIG. 12 has a plurality of compiled image data showing a more detailed perspective view. As can be seen in FIGS. 11-12, the compiled image data forms a three-dimensional representation (X, Y, and Z) of the area of the track bed. The representation has substantial detail, and various aspects of the components of the track bed can be measured. In FIGS. 11-12, for example, cracks or splits in the crosstie 10 are visible. Also, the height of the crosstie 10 with respect to the ballast layer 18 is visible. The orientation and heights of the tie plate 14 and rail 12 are visible. These and other details can be obtained with the disclosed inspection system and associated methods as described in more detail below.

Figure 4A:
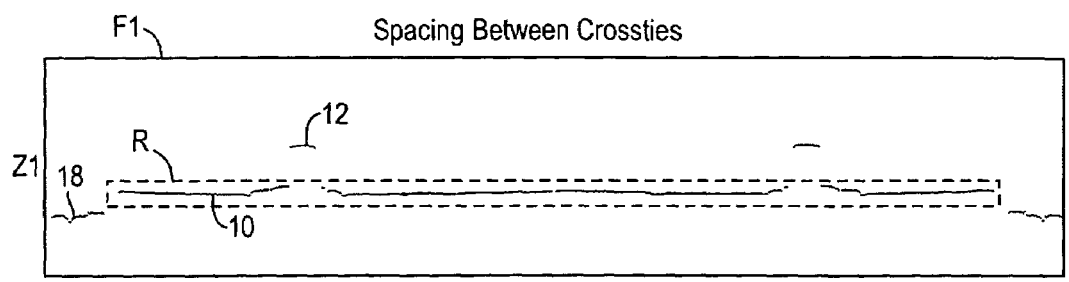
FIGS. 4A-4C illustrate example frames of railroad track obtained with the disclosed inspection system for determining the spacing between the crossties.
Figure 4B:
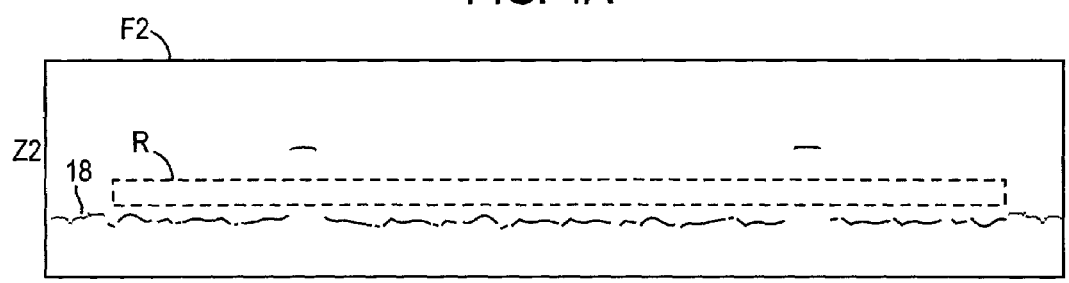
Figure 4C:
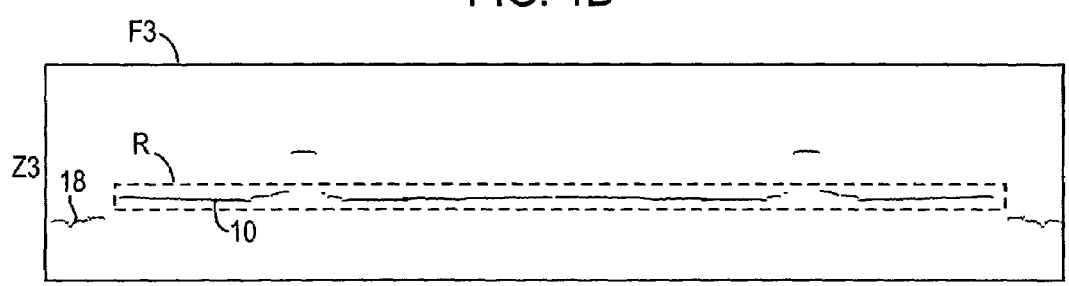

In one example, the spacing between crossties can be determined from the plurality of image data. Referring to FIGS. 4A-4C, example frames of the track bed obtained with the disclosed inspection system 30 are illustrated that can be used to determine the spacing between the crossties 10. FIG. 4A shows an end frame F1 having a contour of a first crosstie 10 that is at position Z1 along the track. This end frame F1 may designate the last frame showing this crosstie 10. FIG. 4B shows an intermediate frame F2 captured some time after the end frame F1 and at a further position Z2 along the track. This intermediate frame F2 lacks a crosstie because it designates a location between crossties of the track. It is understood that a plurality of such intermediate frames will follow the end frame F1 of FIG. 4A. FIG. 4C shows an end frame F3 having another crosstie 10' that is at further position Z3 along the track. Computer analysis can determine the spacing between crossties 10 and 10' by, for example, first counting the number of such intermediate frames F2 lacking a crosstie. This number of intermediate frames F2 can then be multiplied by the known spacing between frames (e.g., 0.1-inch) to calculate the distance between crossties 10 and 10'. In this way, a substantially accurate measurement between crossties of the track bed can be obtained without the need for a track inspector to physically inspect the crossties. Instead, the image data that forms the three-dimensional scan of the track bed is used.

Determining whether a frame has a crosstie or not can be performed by imaging techniques known in the art. For example and as shown in FIG. 4A-4C, the contour of a crosstie 10 is expected in a region of interest R of the frames F1-F3. Computer analysis can search the region of interest R of a frame for pixels indicating the presence of a crosstie. This can be done, for example, by averaging or summing the value of pixels in the region of interest R. Because the contour of the crosstie is composed of dark pixels, the region of interest R in a frame F1 having a crosstie 10 will have a greater average or sum than the region R in an intermediate frame F2 lacking a crosstie.

Figure 5:
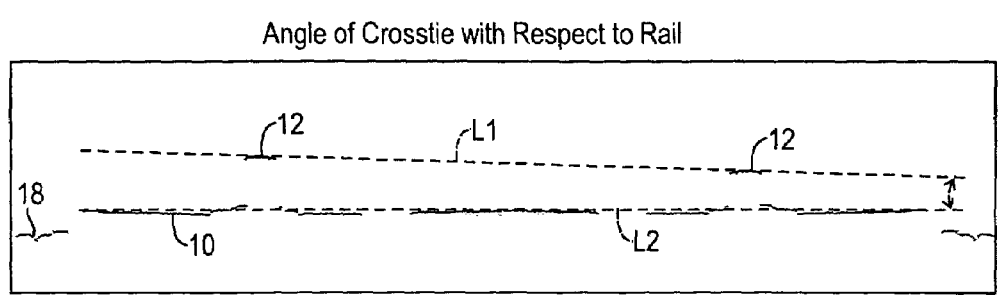
FIG. 5 illustrates an example frame of railroad track obtained with the disclosed inspection system for determining the angle of the crosstie with respect to the rail.

In another example, the angles of the crossties with respect to the rail can be determined from the image data. Referring to FIG. 5, an example frame of railroad track obtained with the disclosed inspection system is illustrated. The angular orientation of the heads of the rails 12 can be represented by a line L1. The line L1 can be estimated, for example, by best fit or curve fitting techniques known in the art. Similarly, the angular orientation of the crosstie 10 can be represented by a line L2. The line L2 can also be estimated, for example, by best fit or curve fitting techniques known in the art. These lines L1 and L2 can be averaged from several of the frames along the Z-axis near the crosstie 10. Computer analysis can then determine the angular relation between these lines L1-L2 to determine the angles of the ties with respect to rail. This condition would indicate either worn rail or a plate cut condition on a wooden crosstie.

Figure 6A:
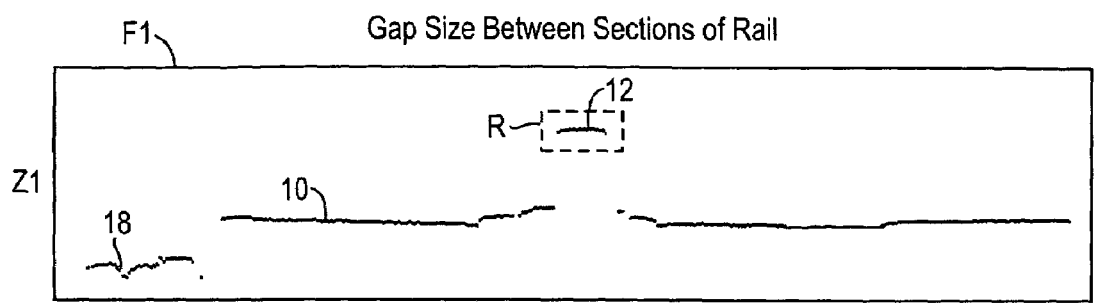
FIGS. 6A-6C illustrate example frames of railroad track obtained with the disclosed inspection system for determining a break or separation in the rail.
Figure 6B:
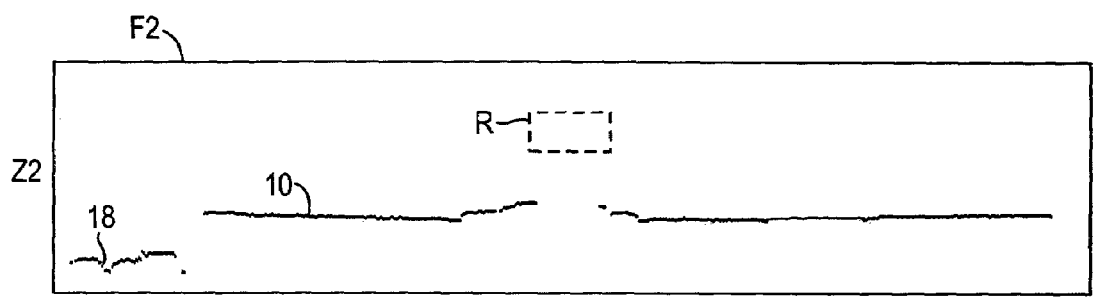
Figure 6C:
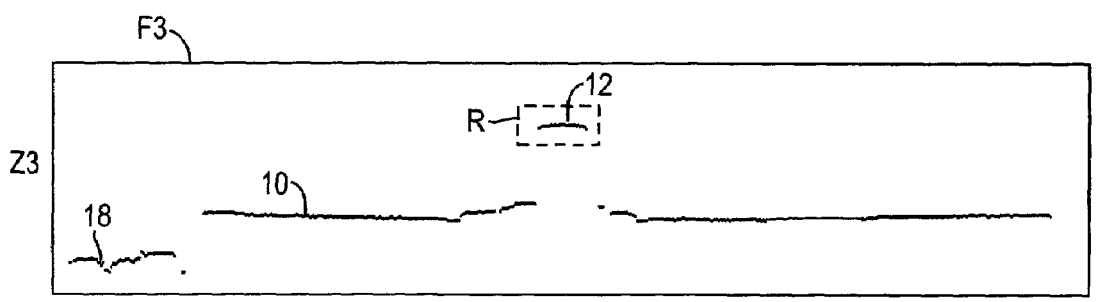

In another example, a break in the rail can be determined from the image data. Referring to FIGS. 6A-6C, example frames F1-F3 of railroad track obtained with the disclosed inspection system are illustrated that can be used to determine the separation of rail 12. FIG. 6A shows an end frame F1 having an end of a first rail 12 that is at position Z1 along the track. This end frame F1 designates the last frame showing this rail 12. FIG. 6B shows an intermediate frame F2 captured some time after the end frame F1 and at a further position Z2 along the track. This intermediate frame F2 lacks a rail because it represents a location between rails of the track. It is understood that a plurality of such intermediate frames F2 may follow the end frame F1 of FIG. 6A. FIG. 6C shows another end frame F3 having another rail 12' that is at further position Z3 along the track. Computer analysis can determine the spacing between the rails 12 and 12', for example, by first counting the number of intermediate frames F2 lacking a rail. This number of intermediate frames F2 can then be multiplied by the known spacing between frames (e.g., 0.1-inch) to calculate the distance between the rails 12 and 12'.

Determining whether a frame has a rail 12 or not can be performed by imaging techniques known in the art. For example and as shown in FIG. 6A-6C, the contour of a rail 12 is expected in a region of interest R of the frames F1-F3. Computer analysis can search the region of interest R of a frame for pixels indicating the presence of a rail contour. This can be done by averaging or summing the value of pixels in the region of interest, for example. Because the contour of the rail is composed of dark pixels, the region of interest R in a frame F1 having a rail 12 will have a greater average or sum than the region R in a frame F2 lacking a crosstie.

Figure 7A:
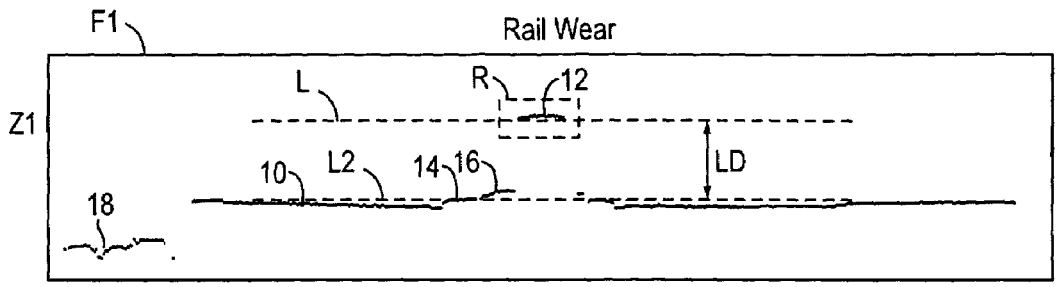
FIGS. 7A-7B illustrate example frames of railroad track obtained with the disclosed inspection system for determining wear of the rail.
Figure 7B:
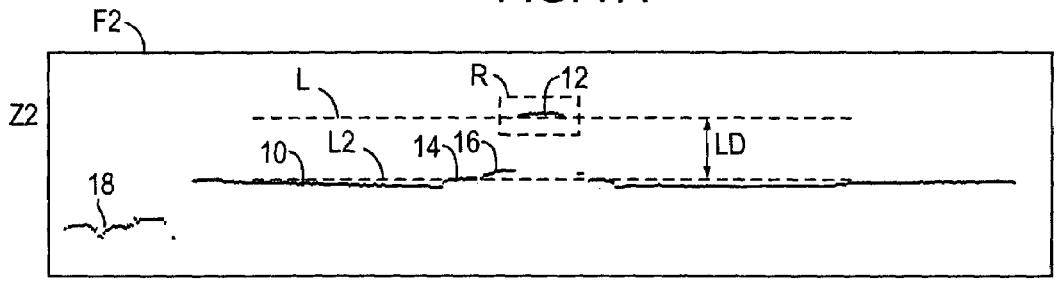

In another example, the wear of the rails can be determined from the image data. Referring to FIGS. 7A-7B, example frames F1-F2, of railroad track obtained with the disclosed inspection system, are illustrated and can be used to determine wear of the rail 12. Computer analysis can determine if a rail 12 has wear, for example, by determining whether the distance between the contour of the rail 12 and a reference point in a frame is less than the same distance in a prior frame. FIG. 7A shows a frame F1 having rail 12 that is at a position Z1 along the track. The contour of the rail 12 lies within a region of interest R and at a level L along the Y-axis of the frame F1. The contour of rail 12 is above a reference level L2, which may be the height of a tie plate, a measurable distance LD. As would be apparent to one of ordinary skill in the art having benefit of this disclosure, reference L2 may be located at a number of reference points such as tie plates 14, spikes 16, or crossties 10, for example. FIG. 7B shows another frame F2 at another position Z2 along the track. At position Z2, the distance LD is less between the contour of the rail 12 and level L2 than at position Z1. Thus, frame F2 may indicate wear of the rail 12 at the position Z2 along the track. As would be apparent to one of ordinary skill in the art having benefit of this disclosure, rail wear could also be determined comparing frames taken at different times, but at the same position along a track bed.

Figure 8:
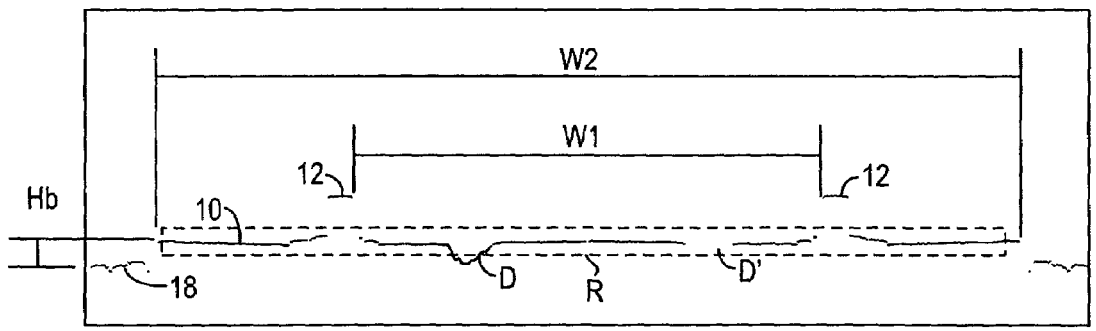
FIG. 8 illustrates an example frame of railroad track obtained with the disclosed inspection system for determining defects in the crosstie, spacing of the rail, size of the crossties, and ballast height relative to the crosstie.

In another example, the defects in the crossties 10 can be determined from the image data. As shown in FIG. 8, an example frame of railroad track obtained with the disclosed inspection system is shown. Defects D and D' are shown in the crosstie 10. Computer analysis can detect if the crosstie 10 has a defect, for example, by determining whether portions D of the contour of the cross tie lie outside a region of interest R or whether portions D' of the contour are absent within the region R. As is known, defects in a crosstie can include cracks, splits, or breaks in the ties. Using the plurality of image data near such a defect, computer analysis can determine the width and length of the defect. For example and as seen in FIGS. 11-12, the plurality of image data can be used to estimate the width W and length L of the crack shown in the edge of the crosstie. In some instances, the computer analysis can determine the depth of the defect, for example, when the orientation of the defect allows light from the laser to be projected within the defect and to be captured by the camera. In one embodiment, the angle between the laser and the camera can be relatively small so that the light projecting into a recessed defect can still be captured by the camera positioned almost parallel to the beam of laser light.

In another example, the spacing or gage of the rail or length of the crossties can be determined from the image data. In FIG. 8, an edge detecting technique known in the art can be used to find edges of the rail contours 12 in the frame, and the distance W1 between the edges can be calculated to estimate the spacing of the rails 12. Similarly, an edge detecting technique known in the art can be used to find edges of the crosstie contour 10 in the frame, and the distance W1 between the edges can be calculated to estimate the width W2 of the crosstie 10.

In another example, the height of ballast 18 relative to the crosstie 10 can be determined from the image data. In FIG. 8, a line fitting technique can determine the level of the ballast 18 and the level of the crosstie 10, and the difference between these levels can estimate the height HB of the ballast 18 relative to the crosstie 10. In another example, the scans of the railroad track can be used to determine the size of stones in the ballast 18. This can be done by analyzing a region of interest having ballast 18 and estimating sizes of the ballast stone using curvatures in the contour of the ballast 18.

Figure 9:
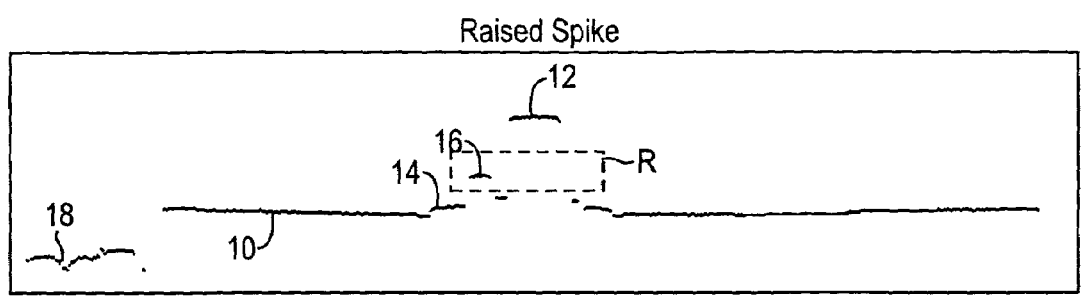
FIG. 9 illustrates an example frame of railroad track obtained with the disclosed inspection system for determining a raised spike.

In another example, raised spikes can be detected from the image data. Referring to FIG. 9, an example frame of railroad track obtained with the disclosed inspection system is illustrated. To determine whether there is a raised spike, a region of interest R can be analyzed to determine whether a portion of the contour representing a raised spike 16 occur within the region R.

Figure 10:
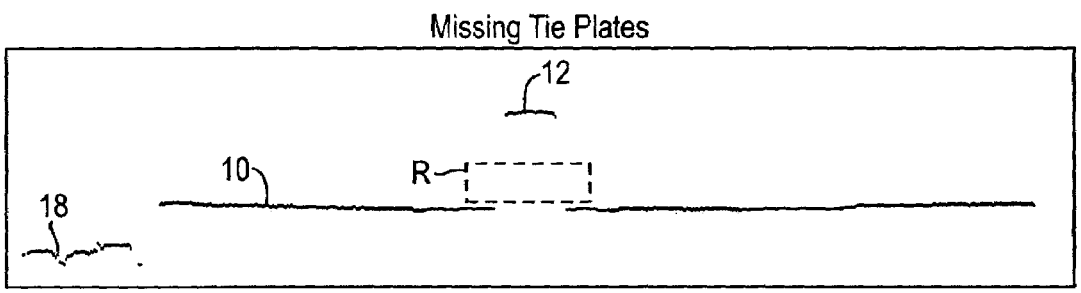
FIG. 10 illustrates an example frame of railroad track obtained with the disclosed inspection system for determining a missing tie plate.

In other examples, missing tie plates, misaligned tie plates, or sunken tie plates can be detected from the image data. Referring to FIG. 10, an example frame of railroad track obtained with the disclosed inspection system is illustrated. The missing or sunken tie plate can be detected, for example, by analyzing a region of interest R and determining whether a portion of the contour representing a tie plate occurs or does not occur within the region R. A misaligned tie plate can be determined by line fitting the portion of the contour of the tie plate and comparing the orientation of the line to that of the crosstie, for example.

The foregoing description of preferred and other embodiments is not intended to limit or restrict the scope or applicability of the inventive concepts conceived of by the Applicant. In exchange for disclosing the inventive concepts contained herein, the Applicant desires all patent rights afforded by the appended claims. Therefore, it is intended that the disclosed inspection system and associated methods include all modifications and alterations to the full extent that they come within the scope of the following claims or the equivalents thereof.

What is claimed is:

1. A system for inspecting a railroad track bed, including the railroad track, to be mounted on a vehicle for movement along the railroad track, the system comprising:
    at least one light generator positioned adjacent the railroad track for projecting a beam of light across the railroad track bed;
    at least one optical receiver positioned adjacent the railroad track for receiving at least a portion of the light reflected from the railroad track bed and generating a plurality of images representative of the profile of at least a portion of the railroad track bed; and
    at least one processor for analyzing the plurality of images and determining one or more physical characteristics of the said portion of the railroad track bed, the one or more physical characteristics comprising at least a geographic location of the plurality of images along the railroad track bed,
    wherein the processor includes an algorithm for determining the distance between crossties of the railroad track bed, the algorithm comprising the steps of:
        (a) analyzing a first frame, one or more intermediate frames and an end frame of the plurality of images, the first and end frames comprising crossties while the one or more intermediate frames lack crossties;
        (b) determining a number of the one or more intermediate frames lacking crossties;
        (c) determining a known spacing between frames; and
        (d) determining the distance between the crossties of the first and end frames based upon the number of the one or more intermediate frames lacking crossties and the known spacing between the frames.

2. The system of claim 1, wherein the light generator is a laser.

3. The system of claim 2, wherein the laser emits an infrared beam of light.

4. The system of claim 1, wherein the at least one light generator is positioned substantially above the railroad track and emits the beam of light substantially perpendicular to the railroad track.

5. The system of claim 2, wherein the laser emits the beam of light with an angular expanse.

6. The system of claim 1, wherein the at least one optical receiver comprises a digital camera.

7. The system of claim 1, wherein the optical device comprises a band pass filter allowing substantially only the wavelength of the beam of light to be captured in the plurality of images.

8. The system of claim 1, wherein the at least one processor comprises a data storage device for storing the plurality of images.

9. The system of claim 1, further comprising a GPS receiver or an encoder that provides the geographical location data for analysis by the processor.

10. The system of claim 1, further comprising a temperature sensor positioned adjacent the railroad track that provides a temperature of the railroad track for analysis by the processor.

11. The system of claim 1, wherein each of the plurality of images comprises a plurality of pixels given X-Y-coordinates.

12. The system of claim 1, wherein each of the plurality of images comprises a Z-coordinate representing the location of the image along the length of railroad track.

13. The system of claim 1, wherein the processor includes an algorithm for identifying specific components of the railroad track bed.

14. The system of claim 1, wherein the processor includes an algorithm for determining a defect in a crosstie of the railroad track bed.

15. The system of claim 1, wherein the processor includes an algorithm for detecting missing, misaligned, damaged, or defective fastener components of the railroad track bed.

16. A system for inspecting a railroad track bed, including the railroad track, to be mounted on a vehicle for movement along the railroad track, the system comprising:
 at least one light generator positioned adjacent the railroad track for projecting a beam of light across the railroad track bed;
 at least one optical receiver positioned adjacent the railroad track for receiving at least a portion of the light reflected from the railroad track bed and generating a plurality of images representative of the profile of at least a portion of the railroad track bed; and
 at least one processor for analyzing the plurality of images and determining one or more physical characteristics of the said portion of the railroad track bed, the one or more physical characteristics comprising at least a geographic location of the plurality of images along the railroad track bed, wherein the processor includes an algorithm for detecting a misaligned or sunken tie plate of the railroad track bed, the algorithm comprising the steps of:
 (a) analyzing a frame of the plurality of images, the frame comprising a region of interest;
 (b) determining whether the region of interest contains a tie plate;
 (c) if a tie plate is present, determining a crosstie contour and a tie plate contour;
 (d) comparing an orientation of the crosstie contour and an orientation of the tie plate contour; and
 (e) determining whether the tie plate is misaligned or sunken based upon the comparison.

17. The system of claim 1, wherein the processor includes an algorithm for determining wear of the rails of the railroad track.

18. The system of claim 1, wherein the processor includes an algorithm for determining spacing of the rails of the railroad track.

19. The system of claim 1, wherein the processor includes an algorithm for determining a height of ballast relative to a crosstie of the railroad track bed.

20. The system of claim 1, wherein the processor includes an algorithm for determining a size of ballast stones of the railroad track bed.

21. The system of claim 1, wherein the processor includes an algorithm for determining a gap size between sections of the railroad track.

22. A method for inspecting railroad track bed, the railroad track bed including crossties, rails, associated fastening hardware, and ballast, the method comprising the steps of:
 a) illuminating a line across the span of the railroad track bed;
 b) receiving at least a portion of the light reflected from the railroad track bed;
 c) generating a plurality of images representative of the profile of at least a portion of the railroad track bed;
 d) analyzing the plurality of images and determining one or more physical characteristics of the said portion of the railroad track bed, the one or more physical characteristics comprising at least a geographic location of the plurality of images along the railroad track bed;
 e) displaying the determined physical characteristics of the said portion of the railroad track bed; and
 f) determining the distance between crossties of the railroad track bed, the step of determining distance comprising the steps of:
 (a) analyzing a first frame, one or more intermediate frames and an end frame of the plurality of images, the first and end frames comprising crossties while the one or more intermediate frames lack crossties;
 (b) determining a number of the one or more intermediate frames lacking crossties;
 (c) determining a known spacing between frames; and
 (d) determining the distance between the crossties of the first and end frames based upon the number of the one or more intermediate frames lacking crossties and the known spacing between the frames.

23. The system of claim 16, wherein the processor includes an algorithm for determining at least one of a presence of a crosstie of the railroad track bed; a presence of a missing, misaligned, damaged, or defective fastener components of the railroad track bed; a wear of the rails of the railroad track; a spacing of the rails of the railroad track; a height of ballast relative to a crosstie of the railroad track bed; a size of ballast stones of the railroad track bed; or a gap size between sections of the railroad track.

24. The method of claim 22, wherein a laser illuminates the line across the span of the railroad track bed.

25. The method of claim 24, wherein the laser emits an infrared beam of light.

26. The method of claim 22, wherein the line across the span of the railroad track bed is substantially perpendicular to the rails of the railroad track bed.

27. The method of claim 24, wherein the laser emits the line with an angular expanse.

28. The method of claim 22, wherein a digital camera receives the at least a portion of light reflected from a portion of the railroad track bed.

29. The method of claim 22, further comprising the step of filtering the portion of light reflected from a portion of the railroad track bed with a band pass filter.

30. The method of claim 22, further comprising the step of storing the plurality of images.

31. The method of claim 22, further comprising the step of providing the geographical location data from a GPS receiver or an encoder.

32. The method of claim 22, further comprising the step of obtaining a temperature of the rails of the railroad track bed.

33. The method of claim 22, wherein the plurality of images comprises a plurality of pixels given X-Y coordinates.

34. The method of claim 33, wherein the plurality of images further comprise a Z coordinate representing the location of the image along the length of rail of the railroad track bed.

35. The method of claim 22, further comprising the step of identifying specific components of the railroad track bed.

36. The method of claim 22, further comprising the step of determining a defect in a crosstie of the railroad track bed.

37. The method of claim 22, further comprising the step of detecting missing, misaligned, damaged, or defective fastener hardware of the railroad track bed.

38. A method for inspecting railroad track bed, the railroad track bed including crossties, rails, associated fastening hardware, and ballast, the method comprising the steps of:
   a) illuminating a line across the span of the railroad track bed;
   d) receiving at least a portion of the light reflected from the railroad track bed;
   e) generating a plurality of images representative of the profile of at least a portion of the railroad track bed;
   d) analyzing the plurality of images and determining one or more physical characteristics of the said portion of the railroad track bed, the one or more physical characteristics comprising at least a geographic location of the plurality of images along the railroad track bed;
   e) displaying the determined physical characteristics of the said portion of the railroad track bed; and
   f) detecting a misaligned or sunken tie plate of the railroad track bed, the step of detecting comprising the steps of:
      (a) analyzing a frame of the plurality of images, the frame comprising a region of interest;
      (b) determining whether the region of interest contains a tie plate;
      (c) if a tie plate is present, determining a crosstie contour and a tie plate contour;
      (d) comparing an orientation of the crosstie contour and an orientation of the tie plate contour; and
      (e) determining whether the tie plate is misaligned or sunken based upon the comparison.

39. The method of claim 22, further comprising the step of determining wear of a rail of the railroad track bed.

40. The method of claim 22, further comprising the step of determining spacing of rails of the railroad track bed.

41. The method of claim 22, further comprising the step of determining a height of ballast relative to a crosstie of the railroad track bed.

42. The method of claim 22, further comprising the step of determining a size of ballast stones of the railroad track bed.

43. The method of claim 22, further comprising the step of determining a gap size between sections of rail of the railroad track bed.

44. The method of claim 38, further comprising the step of providing the geographical location data from a GPS receiver or an encoder.

45. The method of claim 38, further comprising the step of obtaining a temperature of the rails of the railroad track bed.

46. The method of claim 38, the method further comprising the steps of determining at least one of a presence of a crosstie of the railroad track bed; a presence of a missing, misaligned, damaged, or defective fastener component of the railroad track bed; wear of the rails of the railroad track; spacing of the rails of the railroad track; a height of ballast relative to a crosstie of the railroad track bed; a size of ballast stones of the railroad track bed; or a gap size between sections of the railroad track.

47. A method of inspecting railroad track bed having a crosstie, rails, associated fastening hardware, and ballast, the method comprising the steps of:
   a) traveling along the rails;
   b) projecting a focused beam of light across the span of the railroad track bed;
   c) capturing a plurality of images of the focused beam of light projected across a portion of railroad track bed while traveling along the rails;
   d) determining one or more aspects of the portion of the railroad track bed by processing the plurality of images, the one or more aspects comprising at least a geographic location of the plurality of images along the railroad track bed;
   e) outputting the determined one or more aspects of the portion of the railroad track bed; and
   f) determining the distance between crosstie of the railroad track bed, the step of determining distance comprising the steps of:
      (a) analyzing a first frame, one or more intermediate frames and an end frame of the plurality of images, the first and end frames comprising crossties while the one or more intermediate frames lack crossties;
      (b) determining a number of the one or more intermediate frames lacking crossties;
      (c) determining a known spacing between frames; and
      (d) determining the distance between the crossties of the first and end frames based upon the number of the one or more intermediate frames lacking crossties and the known spacing between the frames.

48. The method of claim 47, wherein a laser projects the focused beam of light across the span of the railroad track bed.

49. The method of claim 48, wherein the laser emits an infrared beam of light.

50. The method of claim 48, wherein the laser is positioned substantially above the rails and emits the focused beam of light substantially perpendicular to the rails.

51. The method of claim 48, wherein the laser emits the focused beam of light with an angular expanse.

52. The method of claim 47, wherein a digital camera captures the plurality of images.

53. The method of claim 47, further comprising the step of filtering the projected beam of light with a band pass filter.

54. The method of claim 47, further comprising the step of storing the plurality of images on a data storage device.

55. The method of claim 47, further comprising the step of obtaining the geographical location data from a GPS receiver or an encoder.

56. The method of claim 47, further comprising the step of obtaining the temperature of the rails.

57. The method of claim 47, wherein the plurality of images further comprises a plurality of pixels given X-Y coordinates.

58. The method of claim 57, wherein the plurality of images further comprise a Z coordinate representing the location of the image along the length of the rails.

59. The method of claim 47, further comprising the step of identifying specific components of the railroad track bed.

60. The method of claim 47, further comprising the step of determining a defect in a crosstie of the railroad track bed.

61. The method of claim 47, further comprising the step of detecting a missing, misaligned, damaged, or defective fastening hardware.

62. A method of inspecting railroad track bed having a crosstie, rails, associated fastening hardware, and ballast, the method comprising the steps of:
 a) traveling along the rails;
 b) projecting a focused beam of light across the span of the railroad track bed;
 c) capturing a plurality of images of the focused beam of light projected across a portion of railroad track bed while traveling along the rails;
 d) determining one or more aspects of the portion of the railroad track bed by processing the plurality of images, the one or more aspects comprising at least a geographic location of the plurality of images along the railroad track bed;
 e) outputting the determined one or more aspects of the portion of the railroad track bed; and
 f) detecting a misaligned or sunken tie plate of the railroad track bed, the step of detecting comprising the steps of:
  (a) analyzing a frame of the plurality of images, the frame comprising a region of interest;
  (b) determining whether the region of interest contains a tie plate;
  (c) if a tie plate is present, determining a crosstie contour and a tie plate contour;
  (d) comparing an orientation of the crosstie contour and an orientation of the tie plate contour; and
  (e) determining whether the tie plate is misaligned or sunken based upon the comparison.

63. The method of claim 47, further comprising the step of determining wear of the rails.

64. The method of claim 47, further comprising the step of determining spacing of the rails.

65. The method of claim 47, further comprising the step of determining a height of ballast relative to a crosstie of the railroad track bed.

66. The method of claim 47, further comprising the step of determining a size of ballast stones of the railroad track bed.

67. The method of claim 47, further comprising the step of determining a gap size between sections of rail.

68. The method of claim 62, further comprising the step of providing the geographical location data from a GPS receiver or an encoder.

69. The method of claim 62, further comprising the step of obtaining a temperature of the rails of the railroad track bed.

70. The method of claim 62, the method further comprising the steps of determining at least one of a presence of a crosstie of the railroad track bed; a presence of a missing, misaligned, damaged, or defective fastener component of the railroad track bed; wear of the rails of the railroad track; spacing of the rails of the railroad track; a height of ballast relative to a crosstie of the railroad track bed; a size of ballast stones of the railroad track bed; or a gap size between sections of the railroad track.

71. A system for inspecting a railroad track bed, including the railroad track, to be mounted on a vehicle for movement along the railroad track, the system comprising:
 at least one light generator positioned adjacent the railroad track for projecting a beam of light across the railroad track bed;
 at least one optical receiver positioned adjacent the railroad track for receiving at least a portion of the light reflected from the railroad track bed and generating a plurality of images representative of the profile of at least a portion of the railroad track bed; and
 at least one processor for analyzing the plurality of images and determining one or more physical characteristics of the said portion of the railroad track bed, the one or more physical characteristics comprising at least a geographic location of the plurality of images along the railroad track bed;
 wherein the processor includes an algorithm for identifying a break in a rail of the railroad track bed, the algorithm comprising the steps of:
  (a) analyzing a first frame, one or more intermediate frames and an end frame of the plurality of images, the first and end frames comprising rails while the one or more intermediate frames lack rails;
  (b) determining a number of the one or more intermediate frames lacking rails;
  (c) determining a known spacing between frames; and
  (d) identifying the break in the rail based upon the number of the one or more intermediate frames lacking rails and the known spacing between the frames.

72. The system of claim 71, wherein the processor includes an algorithm for determining at least one of a presence of a crosstie of the railroad track bed; a presence of a missing, misaligned, damaged, or defective fastener components of the railroad track bed; a wear of the rails of the railroad track; a spacing of the rails of the railroad track; a height of ballast relative to a crosstie of the railroad track bed; a size of ballast stones of the railroad track bed; or a gap size between sections of the railroad track.

73. A method for inspecting railroad track bed, the railroad track bed including crossties, rails, associated fastening hardware, and ballast, the method comprising the steps of:
 a) illuminating a line across the span of the railroad track bed;
 b) receiving at least a portion of the light reflected from the railroad track bed;
 c) generating a plurality of images representative of the profile of at least a portion of the railroad track bed;
 d) analyzing the plurality of images and determining one or more physical characteristics of the said portion of the railroad track bed, the one or more physical characteristics comprising at least a geographic location of the plurality of images along the railroad track bed;
 e) displaying the determined physical characteristics of the said portion of the railroad track bed; and
 f) identifying a break in a rail of the railroad track bed, the step of identifying comprising the steps of:
  (a) analyzing a first frame, one or more intermediate frames and an end frame of the plurality of images, the first and end frames comprising rails while the one or more intermediate frames lack rails;
  (b) determining a number of the one or more intermediate frames lacking rails;
  (c) determining a known spacing between frames; and
  (d) identifying the break in the rail based upon the number of the one or more intermediate frames lacking rails and the known spacing between the frames.

74. The method of claim 73, further comprising the step of providing the geographical location data from a GPS receiver or an encoder.

75. The method of claim 73, further comprising the step of obtaining a temperature of the rails of the railroad track bed.

76. The method of claim 73, the method further comprising the steps of determining at least one of a presence of a crosstie of the railroad track bed; a presence of a missing, misaligned, damaged, or defective fastener component of the railroad track bed; wear of the rails of the railroad track; spacing of the rails of the railroad track; a height of ballast relative to a crosstie of the railroad track bed; a size of ballast stones of the railroad track bed; or a gap size between sections of the railroad track.

77. A method of inspecting railroad track bed having a crosstie, rails, associated fastening hardware, and ballast, the method comprising the steps of:
   a) traveling along the rails;
   b) projecting a focused beam of light across the span of the railroad track bed;
   c) capturing a plurality of images of the focused beam of light projected across a portion of railroad track bed while traveling along the rails;
   d) determining one or more aspects of the portion of the railroad track bed by processing the plurality of images, the one or more aspects comprising at least a geographic location of the plurality of images along the railroad track bed;
   e) outputting the determined one or more aspects of the portion of the railroad track bed; and
   f) identifying a break in a rail of the railroad track bed, the step of identifying comprising the steps of:
      (a) analyzing a first frame, one or more intermediate frames and an end frame of the plurality of images, the first and end frames comprising rails while the one or more intermediate frames lack rails;
      (b) determining a number of the one or more intermediate frames lacking rails;
      (c) determining a known spacing between the frames; and
      (d) identifying the break in the rail based upon the number of the one or more intermediate frames lacking rails and the known spacing between the frames.

78. The method of claim 77, further comprising the step of providing the geographical location data from a GPS receiver or an encoder.

79. The method of claim 77, further comprising the step of obtaining a temperature of the rails of the railroad track bed.

80. The method of claim 77, the method further comprising the steps of determining at least one of a presence of a crosstie of the railroad track bed; a presence of a missing, misaligned, damaged, or defective fastener component of the railroad track bed; wear of the rails of the railroad track; spacing of the rails of the railroad track; a height of ballast relative to a crosstie of the railroad track bed; a size of ballast stones of the railroad track bed; or a gap size between sections of the railroad track.

* * * * *

UNITED STATES PATENT AND TRADEMARK OFFICE
CERTIFICATE OF CORRECTION

PATENT NO.        : 7,616,329 B2                                        Page 1 of 1
APPLICATION NO. : 11/172618
DATED             : November 10, 2009
INVENTOR(S)       : Villar et al.

It is certified that error appears in the above-identified patent and that said Letters Patent is hereby corrected as shown below:

Column 13, Line 32:   remove "d)" and insert --b)--

Column 13, Line 34:   remove "e)" and insert --c)--

Signed and Sealed this

Nineteenth Day of January, 2010

David J. Kappos
*Director of the United States Patent and Trademark Office*

US007616329C1

(12) EX PARTE REEXAMINATION CERTIFICATE (10804th)
United States Patent
Villar et al.

(10) Number: US 7,616,329 C1
(45) Certificate Issued: Feb. 2, 2016

(54) SYSTEM AND METHOD FOR INSPECTING RAILROAD TRACK

(75) Inventors: Christopher M. Villar, Georgetown, TX (US); Steven C. Orrell, Georgetown, TX (US); John Anthony Nagle, II, Cedar Park, TX (US)

(73) Assignee: GEORGETOWN RAIL EQUIPMENT COMPANY, Georgetown, TX (US)

Reexamination Request:
No. 90/013,455, Feb. 19, 2015

Reexamination Certificate for:
Patent No.: 7,616,329
Issued: Nov. 10, 2009
Appl. No.: 11/172,618
Filed: Jun. 30, 2005

Certificate of Correction issued Jan. 19, 2010

Related U.S. Application Data

(60) Provisional application No. 60/584,769, filed on Jun. 30, 2004.

(51) Int. Cl.
*G01B 11/14* (2006.01)
*F26B 15/08* (2006.01)
*A21B 1/48* (2006.01)

(52) U.S. Cl.
CPC ............... *F26B 15/085* (2013.01); *A21B 1/48* (2013.01)

(58) Field of Classification Search
CPC .......... G01B 11/14; F26B 15/085; A21B 1/48
See application file for complete search history.

(56) References Cited

To view the complete listing of prior art documents cited during the proceeding for Reexamination Control Number 90/013,455, please refer to the USPTO's public Patent Application Information Retrieval (PAIR) system under the Display References tab.

*Primary Examiner* — Leonardo Andujar

(57) ABSTRACT

A system and method for inspecting railroad track is disclosed. The disclosed system includes lasers, cameras, and a processor. The lasers are positioned adjacent the track. The laser emits a beam of light across the railroad track, and the camera captures images of the railroad track having the beam of light emitted thereon. The processor formats the images so that they can be analyzed to determine various measurable aspects of the railroad track. The disclosed system can include a GPS receiver or a distance device for determining location data. The measurable aspects that can be determined by the disclosed system include but are not limited to the spacing between crossties, the angle of ties with respect to rail, cracks and defects in surface of ties, missing fastener components, misaligned fastener components, sunken tie plates, raised spikes, rail wear, gage of rail, ballast height relative to ties, size of ballast stones, and break or separation in the rail. The system includes one or more algorithms for determining these measureable aspects of the railroad track.

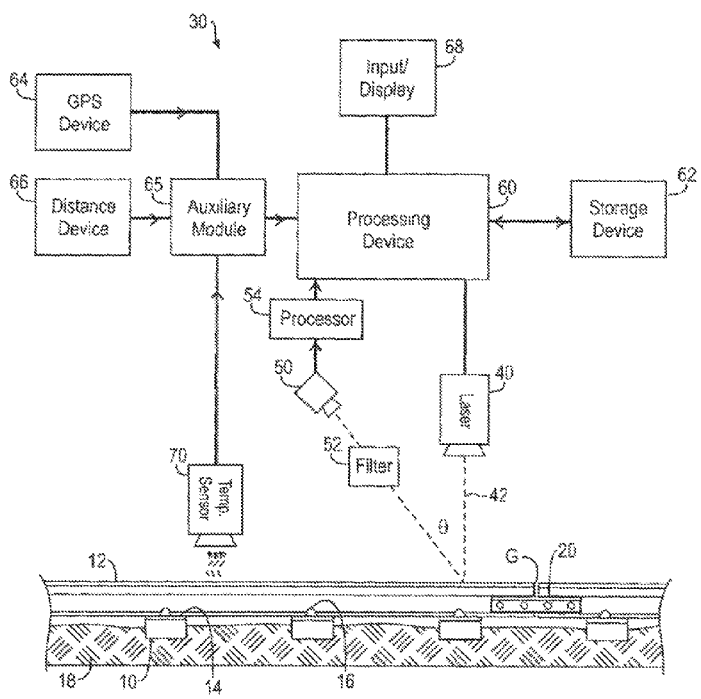

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1, 16 and 71 is confirmed.

Claims 2-15, 17-70 and 72-80 were not reexamined.

\* \* \* \* \*